Oct. 21, 1952 E. J. LOMAZZO 2,614,447
TAILSTOCK
Original Filed May 18, 1946 3 Sheets-Sheet 1

INVENTOR.
Edmund J. Lomazzo
BY
Johnson and Kline
ATTORNEYS

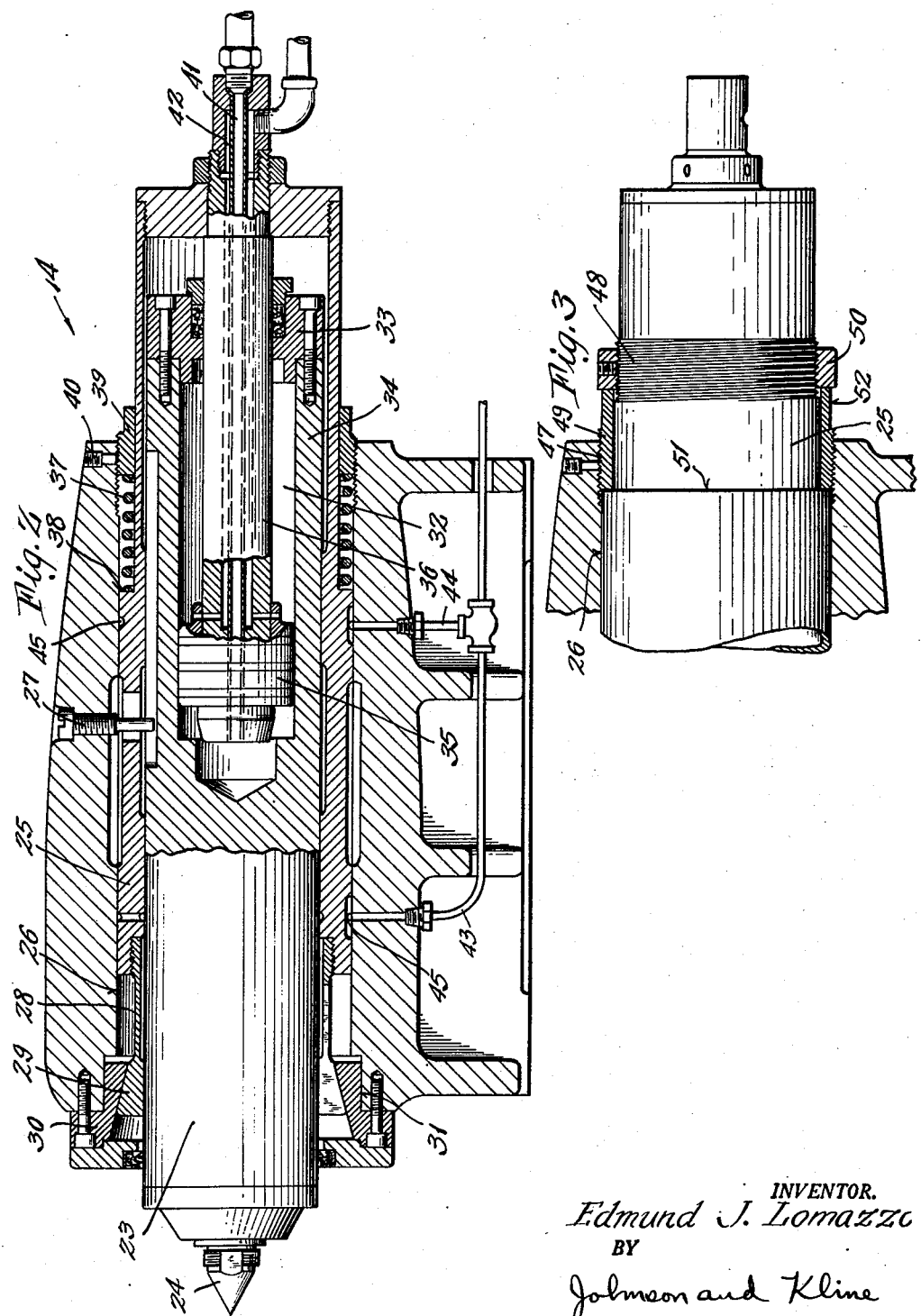

Patented Oct. 21, 1952

2,614,447

UNITED STATES PATENT OFFICE 2,614,447

TAILSTOCK

Edmund J. Lomazzo, Norwalk, Conn., assignor to Sparks Machine Tool Corporation, Norwalk, Conn., a corporation of Connecticut Original application May 18, 1946, Serial No. 670,794. Divided and this application September 25, 1948, Serial No. 51,288

2 Claims. (Cl. 82—31)

This invention relates to a machine tool and particularly to the work holding means therefor. This application is a division of my copending application Serial No. 670,794, filed May 18, 1946.

In accordance with the present invention there is provided an improved work holding system wherein the tailstock is provided with adjustable bearings for taking up wear in the spindle and in which the tailstock spindle is automatically moved to work engaging position with a predetermined pressure on the work, may be automatically locked in said position by the adjustable bearing, and the work chucked by the chucking means in predetermined sequence.

A feature of the present invention resides in the novel manually operated semiautomatic electrohydraulic system for controlling the operation of each of the various elements of the lathe such as the hydraulic pump, the spindle drive and the work holding means which greatly simplifies the number of elements required for the operational control of the lathe and prevents improper operation of the separately controlled instrumentalities.

Other features and advantages of the present invention will be apparent from the specification and claims when considered in connection with the drawings in which:

Fig. 2 is a longitudinal sectional view of the tailstock.

Fig. 3 is a fragmentary sectional view of a modified tailstock.

Figure 1:
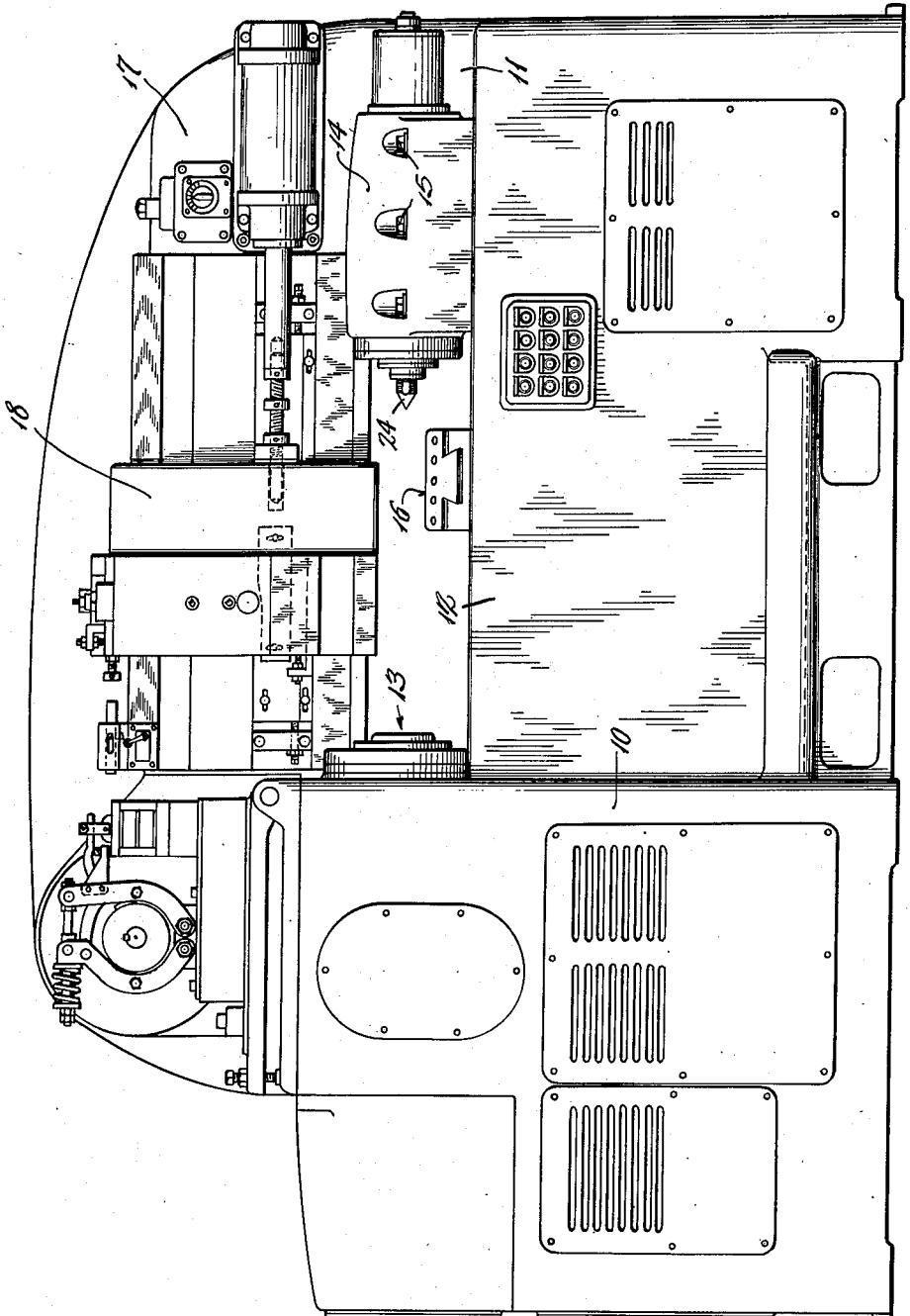
Figure 1 is a front view of the lathe.

As shown in the drawings the lathe comprises a frame having end pedestals 10 and 11 and a main bed 12 extending therebetween. The pedestal 10 has a driven work chuck 13 therein which driven work chuck is substantially the same as that shown in the Sparks et al. Patent No. 2,389,746. The main bed is provided with the usual ways (not shown) for slidably supporting the tailstock 14 in adjusted position therealong in which position it is clamped by screws 15 to support work mounted in the chuck. The bed also carries a back tool-carrying carriage 16 which is movable toward and away from the work and longitudinally of the work. The pedestals 10, 11 carry a top frame 17 having a top tool-carrying carriage 18 thereon. The specific structure of the two carriages and their operation is disclosed and claimed in my copending application, Serial No. 51,289, filed September 25, 1948.

Figure 4:
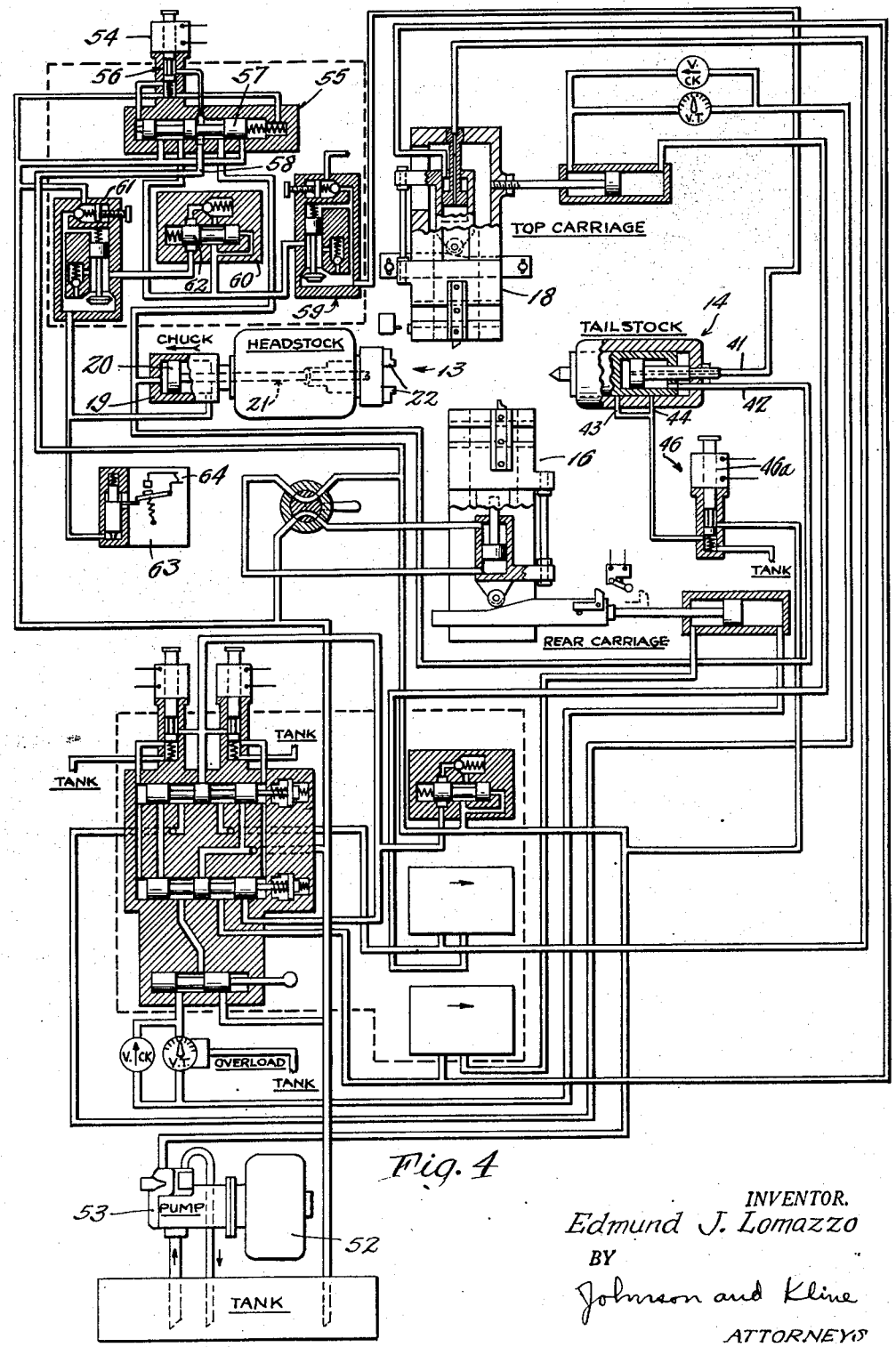
Fig. 4 is a hydraulic diagram of the electrohydraulic control system.

The chuck 13 is hydraulically operated in substantially the same way as in the aforementioned patent. The operating means for the chuck is illustrated in Fig. 4 as a cylinder 19 having a piston 20 reciprocating therein under hydraulic pressure. The piston actuates the draw or chuck rod 21 to close and release the jaws 22 in the usual manner.

The tailstock as shown in Fig. 2 is provided with a sliding quill 23 having a live center 24 which is mounted in the quill on the usual roller or ball bearings (not shown) for free rotation therein.

In practice the quill becomes worn through continued use and becomes wobbly and unsteady in the tailstock. The present invention provides a bearing for the quill which will take up the wear and, in one form of the invention, provides for locking the quill in work supporting position.

This bearing is in the form of a sleeve 25 surrounding the quill and in which the quill is slidable. The bearing is slidable in a bore 26 in the tailstock frame and the quill and sleeve are held against rotation by a key 27. The sleeve has at its forward end a split section 28 forming bearing fingers 29 which cooperate with a cam ring 30 secured in an enlargement 31 of the bore at the front of the tailstock frame so that the end of the bearing fingers are inwardly deflected by the cam ring to engage and support the quill and take up any wear therebetween.

In the form of the invention shown in Fig. 2 the take-up is automatic and the bearing fingers perform the additional function of automatically locking the quill in work supporting position. In accomplishing this, the quill is provided with a bore 32 at the back end which is closed by the plate 33 and forms the cylinder 34 in which is mounted a piston 35 having a piston rod 36 passing through the plate and fixed to the bearing sleeve 25. The sleeve is normally urged into the forward position in which the bearing fingers are relieved of pressure against the quill by means of a spring 37 surrounding the sleeve and having one end bearing on the shoulder 38 on the sleeve and the other end engaging the adjusting nut 39 threaded into the tailstock frame as shown in Fig. 2 and locked by a set screw 40.

The piston rod has two conduits 41, 42 therein. Conduit 41 passes through the piston and into the head of the cylinder and conduit 42 opens into the rod end of the cylinder. When pressure is applied to conduit 41, the fluid enters the cylinder and acts against the front wall to move the quill and center forward into engagement with the work. When the quill is stopped by engagement with the work, pressure builds up in the cylinder and acts on the piston and moves it and the bearing sleeve backward against the action of the spring until the bearing fingers are tightened about the quill and not only hold it against lateral play but also against longitudinal movement.

A feature of the invention resides in the fact that the pressure of the center against the work can be readily regulated by adjusting the tension in the spring by means of the adjusting nut 39. With the pressure thus regulated danger of jamming or damaging the bearings by undue pressure on the center is eliminated for the quill will always be locked in position in which the pressure on the work is only that necessary to overcome the spring, and any increased pressure in the cylinder cannot be transmitted, due to the locking of the quill, to increase the pressure of the center against the work.

After the quill has been locked, the pressure which is built up in the cylinder will cause the sequence valve (as hereinafter described) to operate and connect pressure to the rod end of the chucking cylinder 19 which causes the piston 20 to move the chuck jaws 22 into work holding position and maintain them in said position.

When it is desired to release the holding means the pressure is applied to the head end of the chucking cylinder causing the piston 20 to move the chucking jaws to be released and also pressure is applied to the conduit 42 in the piston rod and the rod end of cylinder 34. This pressure, since the quill is held stationary, will cause the piston 35 to move forwardly drawing the bearing sleeve with it and releasing the bearing fingers from locking engagement with the quill. Thereafter, the quill cylinder will move back readily and out of engagement with the work.

If it is desired the hydraulic fluid may be used to lubricate the tailstock spindle mechanism. As shown in Figs. 2 and 4 two conduits 43, 44 are extended through the tailstock frame into the oil-receiving grooves 45 disposed about the sleeve. A solenoid controlled valve 46, connected in the electrical circuit for actuating the holding means, will connect the conduits to the pressure line momentarily during the operation of the chucking button (not shown) for closing of the chucking circuit to give a squirt of fluid to the spindle for each operation thereof as will be more fully explained in connection with the electrohydraulic circuits.

If the locking feature is not required the bearing sleeve may be mounted in the tailstock frame for adjustment longitudinally therein to cause the bearing fingers to be moved along the cam ring and into engagement with the quill to take up any play which might occur. This adjustment may be made in many ways, for example in Fig. 3, the tailstock bore 26 is threaded at 47 and the sleeve 25 is threaded at 48. A nut 49 is rotatable on the sleeve and threaded into the tailstock frame and a nut 50 threaded on the sleeve clamps the nut against a shoulder 51 on the sleeve. When it is desired to take up wear, nut 50 is loosened and a wrench is applied to the portion 52 of the nut 49 and it is turned to draw the sleeve back and move the fingers in. Then the nut 50 is tightened and locks the sleeve in position.

In operating the work holding means the tailstock quill and center is first moved into engagement with the work and thereafter the chuck is operated to grip the work and hold the work until the operations have been completed and an unchucking operation is manually initiated. The complete hydraulic system for the machine and its operation are disclosed and claimed in my above-mentioned copending application Serial No. 670,794.

The operating circuit is shown diagrammatically in Fig. 4 in neutral position. The motor 52 driving the pump 53 is energized and the pump delivers fluid under pressure to all operating parts of the system.

The workpiece may now be placed in the machine between the chuck and the tailstock center and a circuit closed through the chuck button switch (not shown) to solenoid 54 forming a part of the hydraulic work holding valve 55.

Referring now to the hydraulic circuit diagram (Fig. 4) the energization of solenoid 54 actuates the pilot valve 56 of holding valve 55 to admit fluid pressure to the left end of valve spool 57 and move it to the right-hand position. This connects the main pressure port 58 of valve 55 to a line leading to a pressure reducing valve 59 and, by means of a branch line, to a sequence valve 60. Valve 60 is also connected by a line to a second pressure reducing valve 61. The spring setting of sequence valve 60 is such, however, that fluid pressure first flows through the valve 59 at reduced pressure, to the head end of the tailstock quill cylinder, through conduit 41, which, because the piston is in a fixed position, moves the quill to the left causing the tailstock center to engage the work and push it into the chuck. Exhaust fluid from the rod end of the quill cylinder passes through conduit 42 to work holding valve 55 and thence to tank.

As the work comes to its final position in the chuck the pressure builds up in the quill cylinder and serves to move the bearing sleeve 25 to lock the same in operating position as hereinbefore describd. After the quill is thus automatically locked, the built-up pressure then becomes sufficient to move the spool 62 of the sequence valve 60 to the left thus connecting its pressure port to a line leading to the second pressure reducing valve 61. Fluid at reduced pressure then flows through valve 61 direct to the rod end of the chuck operating cylinder 19, moving its piston 20 to the left and, by means of the draw or chuck rod 21 projecting through the spindle, actuating the chuck jaws 22 to grip the workpiece.

As the chuck jaws 22 reach their final position the further building up of the pressure in the chuck cylinder to a predetermined value serves to operate, through a branch line, a pressure switch 63 connected in the electrical control circuit 64 of the spindle drive motor which is normally open. Until this switch is closed, by pressure in excess of that required to rigidly hold the workpiece, the spindle cannot be rotated. Exhaust fluid from the head end of the chuck cylinder 19 passes to holding valve 55 and to tank.

The workpiece is now securely held in position for the cutting operation and cannot be released until the circuit through solenoid 54 is opened to unchuck the work.

When it is desired to remove a finished workpiece, the operator breaks the circuit to solenoid 54 on holding valve 55.

As solenoid 54 is deenergized the pressure port of associated pilot valve 56 is closed and the line from the left end of spool 57 is connected to a tank line thus allowing the spool to move to its left-hand position under influence of its associated spring. The left-hand position of spool 57 connects the valve pressure port 58 with a line leading directly to the head end of chuck cylinder 19 and to the rod end of the tailstock quill cylinder 34. Thus the chuck jaws 22 are caused to retract and the tailstock quill to recede from the work permitting it to be removed from the machine. Exhaust fluid from the head end of the tailstock quill cylinder 34 passes through the piston to tank via lines to pressure reducing valve 59 where it is by-passed freely over the lower check valve contained therein, and thence through valve 55. Exhaust fluid from the rod end of chuck cylinder 19 passes to pressure reducing valve 61, where it is freely by-passed over the lower check valve contained therein, thence to sequence valve 60, and then to and through valve 55 to tank. As this latter hydraulic circuit from the chuck cylinder is connected to tank the pressure in this line drops and permits pressure switch 63 to open in preparation for the next work cycle.

When the feature of lubricating the tailstock spindle is incorporated in the machine whereby lubrication of the tailstock mechanism is automatically accomplished at regular operating intervals the two-way, solenoid controlled valve 46 is provided having its pressure port connected directly to a hydraulic pump pressure line and its solenoid 46a electrically connected in the chuck control circuit in such a way that every time chuck starting buttom is depressed the solenoid 46a is energized and momentarily opens the hydraulic pressure port of valve 46 to a line leading to the tailstock lubricating system and thus delivers a shot of oil to the system.

Variations and modifications may be made within the scope of this invention and portions of the improvements may be used without others.

I claim:

1. In a machine tool having work holding means including a tailstock frame provided with a movable tailstock spindle carrying a work engaging center and means for locking the spindle in work engaging position; and hydraulic means for moving the center into engagement with the work with a predetermined pressure including adjustable means on the exterior of the tailstock for varying said pressure, said adjustable means including an annular nut surrounding the tailstock spindle and threaded to the tailstock frame.

2. In a machine tool having work holding means including a tailstock frame provided with a movable tailstock spindle carrying a work engaging center and adjustable bearing means for the spindle; and hydraulic means included a piston connected to the bearing means operative in a cylinder in the spindle to move the center into engagement with the work with a predetermined pressure and thetreafter adjust the bearing means to take-up for wear between the bearing and spindle, said bearing means comprising a sleeve having a portion of reduced outer diameter forming a forward shoulder, a spring surrounding and supported by said portion and having one end abutting said shoulder, and an adjustable abutment comprising an annular member surrounding the sleeve and threaded to the tailstock frame and engaging the other end of the spring to vary the tension in said spring and said predetermined pressure, said adjustable abutment having a portion extending to the exterior of the tailstock whereby adjustments thereof can be made without dismantling the tailstock.

EDMUND J. LOMAZZO.

REFERENCES CITED

The following references are of record in the file of this patent:

UNITED STATES PATENTS

| Number | Name | Date |
|---|---|---|
| 651,381 | Peters | June 12, 1900 |
| 1,162,794 | Magnuson | Dec. 7, 1915 |
| 1,408,837 | Soholewski | Mar. 7, 1922 |
| 1,834,831 | Drummond | Dec. 1, 1931 |
| 2,140,565 | Svenson | Dec. 20, 1938 |
| 2,389,746 | Sparks | Nov. 27, 1945 |